United States Patent
Zhu

(10) Patent No.: US 12,360,860 B2
(45) Date of Patent: Jul. 15, 2025

(54) THREE-DIMENSIONAL DATA DYNAMIC STORAGE METHOD, STORAGE MEDIUM AND COMPUTER

(71) Applicant: Xiaojun Zhu, Zhejiang (CN)

(72) Inventor: Xiaojun Zhu, Zhejiang (CN)

( * ) Notice: Subject to any disclaimer, the term of this patent is extended or adjusted under 35 U.S.C. 154(b) by 0 days.

(21) Appl. No.: 18/436,057

(22) Filed: Feb. 8, 2024

(65) Prior Publication Data

US 2024/0272992 A1 Aug. 15, 2024

(30) Foreign Application Priority Data

Feb. 10, 2023 (CN) .......................... 202310098626.X

(51) Int. Cl.
| | |
|---|---|
| *G06F 11/14* | (2006.01) |
| *G06F 16/11* | (2019.01) |
| *G06F 16/13* | (2019.01) |
| *G06F 21/60* | (2013.01) |

(52) U.S. Cl.
CPC ........ *G06F 11/1469* (2013.01); *G06F 16/116* (2019.01); *G06F 16/13* (2019.01); *G06F 21/602* (2013.01); *G06F 2201/84* (2013.01)

(58) Field of Classification Search
None
See application file for complete search history.

(56) References Cited

U.S. PATENT DOCUMENTS

| | | | | | |
|---|---|---|---|---|---|
| 6,129,872 | A | * | 10/2000 | Jang ...................... | B29B 7/582 |
| | | | | | 425/162 |
| 8,725,417 | B1 | * | 5/2014 | Young ..................... | G08G 5/53 |
| | | | | | 701/533 |
| 10,553,031 | B2 | * | 2/2020 | Alt ...................... | G06F 3/04815 |
| 11,779,464 | B2 | * | 10/2023 | Kim ...................... | G16H 50/50 |
| | | | | | 703/11 |
| 2009/0189975 | A1 | * | 7/2009 | Yanagita .............. | H04N 13/189 |
| | | | | | 348/47 |
| 2016/0225179 | A1 | * | 8/2016 | Sheppard .............. | G06T 19/003 |
| 2018/0025543 | A1 | * | 1/2018 | Troy .................... | G06T 19/003 |
| | | | | | 345/419 |
| 2020/0085579 | A1 | * | 3/2020 | Kim ...................... | B29C 64/386 |
| 2024/0272992 | A1 | * | 8/2024 | Zhu .................... | G06F 11/1469 |

OTHER PUBLICATIONS

An Overview of 3D Data Content, File Formats and Viewers (Year: 2008).*

* cited by examiner

*Primary Examiner* — Kim T Nguyen

(57) ABSTRACT

The present invention relates to a method for dynamically storing three-dimensional data, a storage medium and a computer. The method for dynamically storing three-dimensional data comprises: converting an original file into a three-dimensional file, storing the three-dimensional file in an initial storage location in three-dimensional space; changing the storage location of the three-dimensional file in three-dimensional space in accordance with a preset movement rule; restoring the three-dimensional file from a current storage location to an initial storage location according to a preset movement rule; restoring the three-dimensional file to an original file. The three-dimensional data of the present invention is stored in a process that enhances the difficulty of cracking by constantly changing the spatial storage location, thereby improving the security of the data.

7 Claims, 4 Drawing Sheets

THREE-DIMENSIONAL DATA DYNAMIC STORAGE METHOD, STORAGE MEDIUM AND COMPUTER

CROSS REFERENCE TO RELATED APPLICATIONS

The present application claims the benefit of Chinese Patent Application No. 202310098626. X filed on Feb. 10, 2023, the contents of which are incorporated herein by reference in their entirety.

FIELD OF THE INVENTION

The present invention relates to the field of data storage security, and more particularly to a method for dynamically storing three-dimensional data, a storage medium and a computer.

DESCRIPTION OF THE RELATED ART

The current era is an information age. Data security is an important topic in the information age, and how to ensure user data security deserves in-depth study. With the development of computing power and big data and other technologies, the cracking ability of criminals is constantly improving. The traditional function encryption method is no longer able to guarantee the security of data, and there is an urgent need for a new encryption method to guarantee the security of data. The inventor is inspired from the biological point of view, considering that the cell not only has a three-dimensional structure, and the cytoplasm will flow continuously, thus thinking about imitating the cell structure to enhance data security.

SUMMARY OF THE INVENTION

The technical problem to be solved by the present invention is to provide a three-dimensional data dynamic storage method, a storage medium and a computer.

The technical solution adopted by the present invention to solve its technical problem is: constructing a method for dynamically storing three-dimensional data, comprising the following steps:
converting an original file into a three-dimensional file, storing the three-dimensional file in an initial storage location in three-dimensional space;
changing the storage location of the three-dimensional file in three-dimensional space in accordance with a preset movement rule;
restoring the three-dimensional file from a current storage location to the initial storage location according to the preset movement rule;
restoring the three-dimensional file to the original file.

Further, in the method for dynamically storing three-dimensional data described in the present invention, converting the original file into a three-dimensional file comprises: dividing the original file into multiple data segment groups, and storing the plurality of data segment groups in three dimensions;
changing the storage location of the three-dimensional file in three-dimensional space in accordance with a preset movement rule comprises: changing the storage location of each of the data segment groups in the three-dimensional file in accordance with the preset movement rule;
restoring the three-dimensional file from a current storage location to the initial storage location according to the preset movement rule comprises: restoring each of the data segment groups in the three-dimensional file from the current storage location to the initial storage location according to the preset movement rule.

Further, in the method for dynamically storing three-dimensional data described in the present invention, dividing the original file into multiple data segment groups comprises:
dividing the original file into multiple data segment groups of the same size; or
dividing the original file into multiple data segment groups of different sizes.

Further, in the method for dynamically storing three-dimensional data described in the present invention, changing the storage location of each of the data segment groups in the three-dimensional file in accordance with the preset movement rule comprises: changing the storage location of each of the data segment groups in the three-dimensional file in accordance with temporal information;
restoring each of the data segment groups in the three-dimensional file from the current storage location to the initial storage location according to the preset movement rule comprises: restoring each of the data segment groups in the three-dimensional file from the current storage location to the initial storage location based on the temporal information.

Further, in the method for dynamically storing three-dimensional data described in the present invention, the temporal information comprises at least one of a preset time point, a preset time interval, a time for opening a file, and a time for saving a file.

Further, in the method for dynamically storing three-dimensional data described in the present invention, converting the original file into the three-dimensional file comprises: encrypting the original file in accordance with a preset encryption algorithm to obtain an encrypted file, and converting the encrypted file into a three-dimensional file;
restoring the three-dimensional file to the original file comprises: restoring the three-dimensional file to the encrypted file, and the encrypted file being decrypted by a preset decryption algorithm and restored to the original file.

Additionally, the present invention provides a method for dynamically storing three-dimensional data, comprising the following steps:
converting an original file into a three-dimensional file, and storing the three-dimensional file in an initial storage location in three-dimensional space;
changing the storage location of the three-dimensional file in three-dimensional space in accordance with a preset movement rule.

Further, in the method for dynamically storing three-dimensional data described in the present invention, converting the original file into a three-dimensional file comprises: dividing the original file into multiple data segment groups, and storing the plurality of data segment groups in three dimensions;
changing the storage location of the three-dimensional file in three-dimensional space in accordance with a preset movement rule comprises: changing the storage location of each of the data segment groups in the three-dimensional file in accordance with the preset movement rule.

Further, in the method for dynamically storing three-dimensional data described in the present invention, changing the storage location of each of the data segment groups in the three-dimensional file in accordance with the preset movement rule comprises: changing the storage location of each of the data segment groups in the three-dimensional file in accordance with temporal information; and the temporal information comprises at least one of a preset time point, a preset time interval, a time for opening a file, and a time for saving a file.

Additionally, the present invention provides a method for dynamically storing three-dimensional data, comprising the following steps:

reading a three-dimensional file, and restoring the three-dimensional file from a current storage location to an initial storage location according to a preset movement rule;

restoring the three-dimensional file to an original file.

Further, in the method for dynamically storing three-dimensional data described in the present invention, restoring the three-dimensional file from a current storage location to an initial storage location according to a preset movement rule comprises: restoring each of data segment groups in the three-dimensional file from the current storage location to the initial storage location according to the preset movement rule, wherein the three-dimensional file comprises multiple data segment groups.

Further, in the method for dynamically storing three-dimensional data described in the present invention, restoring each of data segment groups in the three-dimensional file from the current storage location to the initial storage location according to the preset movement rule comprises: restoring each of the data segment groups in the three-dimensional file from the current storage location to the initial storage location based on temporal information; and the temporal information comprises at least one of a preset time point, a preset time interval, a time for opening a file, and a time for saving a file.

Additionally, the present invention provides a computer-readable storage medium, the computer-readable storage medium storing a computer program, the computer program being adapted to be loaded by a processor to perform the steps of the method for dynamically storing the three-dimensional data as described above.

Additionally, the present invention provides a computer comprising a memory and a processor, the memory storing a computer program, and the processor performing the steps of the method of dynamically storing the three-dimensional data as described above by calling the computer program stored in the memory.

The method of dynamically storing three-dimensional data, the storage medium and the computer by implementing the present invention have the following advantages: the three-dimensional data of the present invention is stored in a process that enhances the difficulty of cracking by constantly changing the spatial storage location, thereby improving the security of the data.

BRIEF DESCRIPTION OF THE DRAWINGS

A detailed description of the present invention will be provided below with reference to the attached drawings and embodiments, and in the drawings.

DETAILED DESCRIPTION OF PREFERRED EMBODIMENTS OF THE INVENTION

For better understanding of the technical features, purposes, and efficacy of the present invention, embodiments of the present invention will be described in detail with reference to the drawings.

Figure 1:
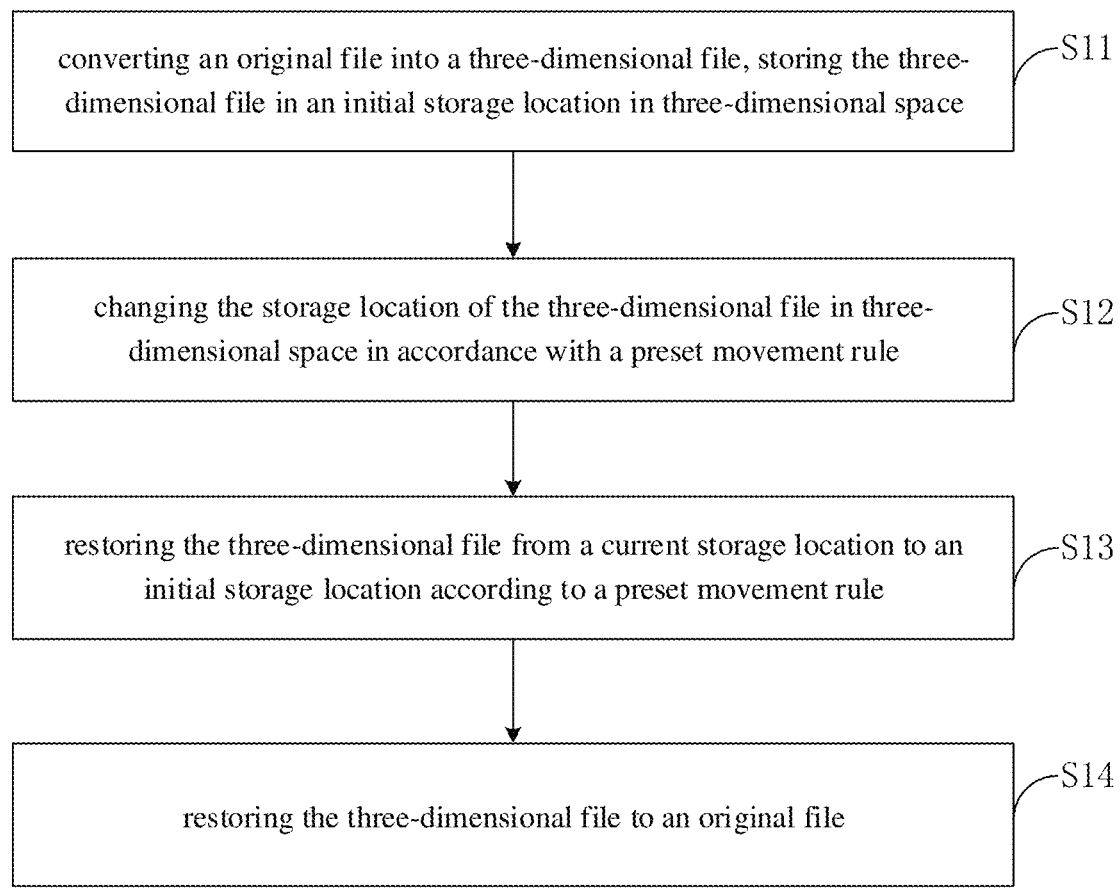
FIG. 1 is a flow chart of a method for dynamically storing three-dimensional data provided by an embodiment of the present invention.

In a preferred embodiment, referring to FIG. 1, a method for dynamically storing three-dimensional data according to the instant embodiment comprises the following steps:

S11, converting an original file into a three-dimensional file, storing the three-dimensional file in an initial storage location in three-dimensional space.

Specifically, the original file herein refer to a file stored in a non-three-dimensional storage manner, that is, a file stored directly using a byte stream, such as commonly used document file, image file, audio file, video file, etc. In the prior art, the original file is directly stored on the storage medium, or encrypted and stored on the storage medium, which are all in the manner of direct storage using a byte stream. In order to improve security, in this embodiment, a three-dimensional spatial storage technique is used, wherein the original file is converted into a three-dimensional file and stored in the three-dimensional space. A location for initially storing a three-dimensional file in three-dimensional space in accordance with a three-dimensional storage rule is used as the initial storage location. Since data is stored in three dimensions in a three-dimensional format, each data location is three-dimensional, which makes it more difficult to read and sort, and naturally more secure, compared to data stored directly using a byte stream. Understandably, although the three-dimensional file of the present embodiment is also stored on the storage medium in the form of a byte stream, it is distinguished from the prior art in which the byte stream is used for direct storage. The byte stream corresponding to the three-dimensional file in the present embodiment contains three-dimensional spatial information, which essentially indicates the stored three-dimensional space and the storage location in the three-dimensional space.

S12, changing the storage location of the three-dimensional file in three-dimensional space in accordance with a preset movement rule.

Specifically, in order to further improve data security, in this embodiment, after storing the three-dimensional file, the bionic technology is used, which imitates the flow characteristic of the cytoplasm in the cell, so that the three-dimensional file "flows" in the three-dimensional storage space, that is, in accordance with the preset movement rule to change the three-dimensional file in the three-dimensional spatial storage location, so that the three-dimensional file is in the dynamic change. Alternatively, when changing the storage location of the three-dimensional file in three-dimensional space, it can be chosen to change it only once or to change it several times continuously. Understandably, by constantly changing the storage location of the three-dimensional file, it makes it difficult for a cracker to determine the definitive location of one of particular three-dimensional file, and not being able to determine the spatial location of the three-dimensional file, it is not possible to crack the file, thereby ensuring the security of the file.

S13, restoring the three-dimensional file from a current storage location to an initial storage location according to a preset movement rule.

Specifically, when a user needs to use the three-dimensional file, the three-dimensional file is restored from the current storage location to the initial storage location according to the preset movement rule. In other words, the three-dimensional file is moved in reverse according to the preset movement rule so that the three-dimensional file is brought back to the initial storage location. The initial storage location is the initial storage location of the three-dimensional file in the three-dimensional space.

S14, restoring the three-dimensional file to an original file.

Specifically, after restoring the three-dimensional file from the current storage location to the initial storage location, a step opposite to converting the original file to the three-dimensional file is performed, that is, restoring the three-dimensional file to the original file.

The three-dimensional data of the embodiment is stored in a process that enhances the difficulty of cracking by constantly changing the spatial storage location, thereby improving the security of the data.

Figure 4:
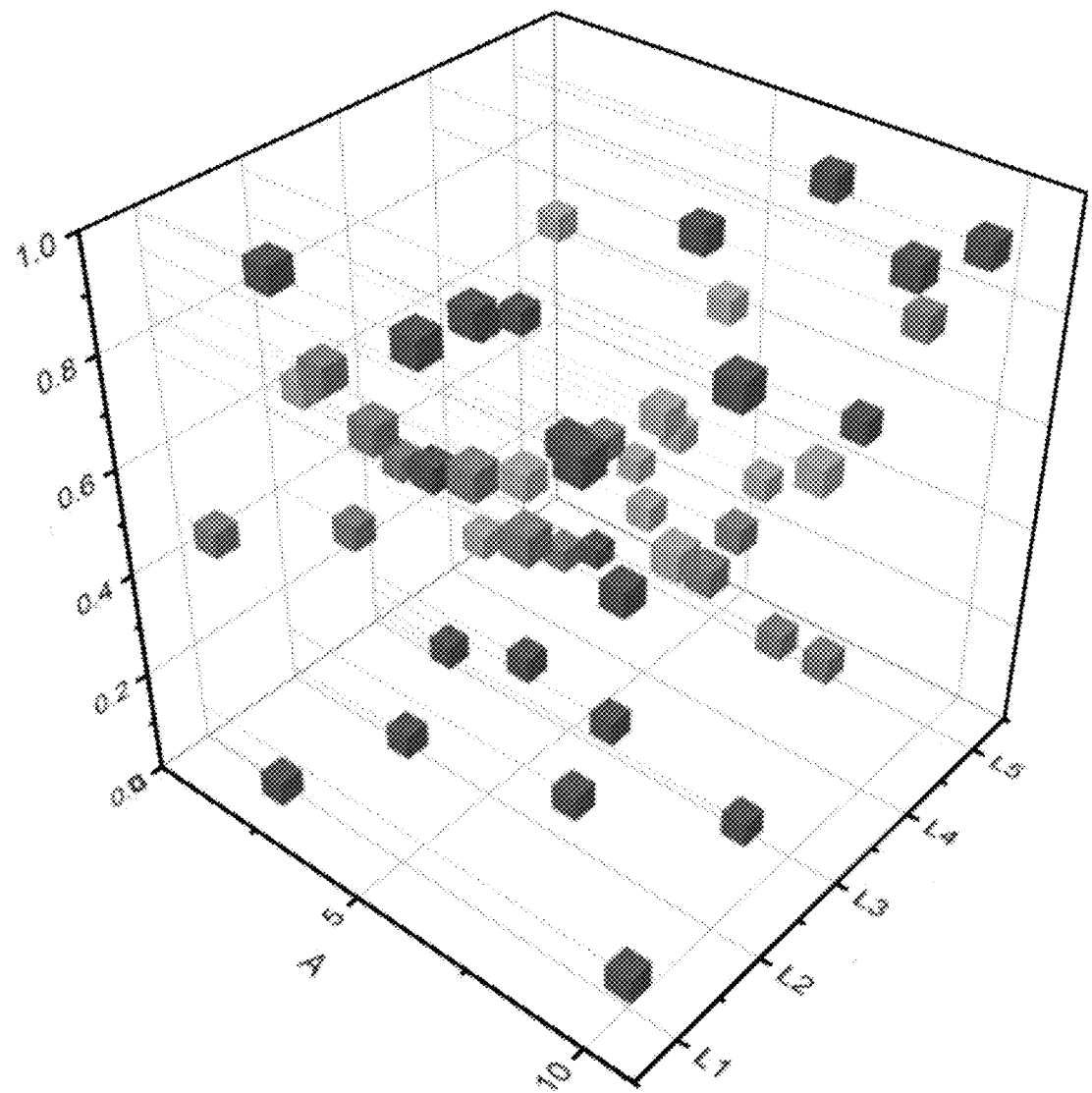
FIG. 4 is a schematic diagram of storage of three-dimensional data provided by an embodiment of the present invention.
Figure 5:
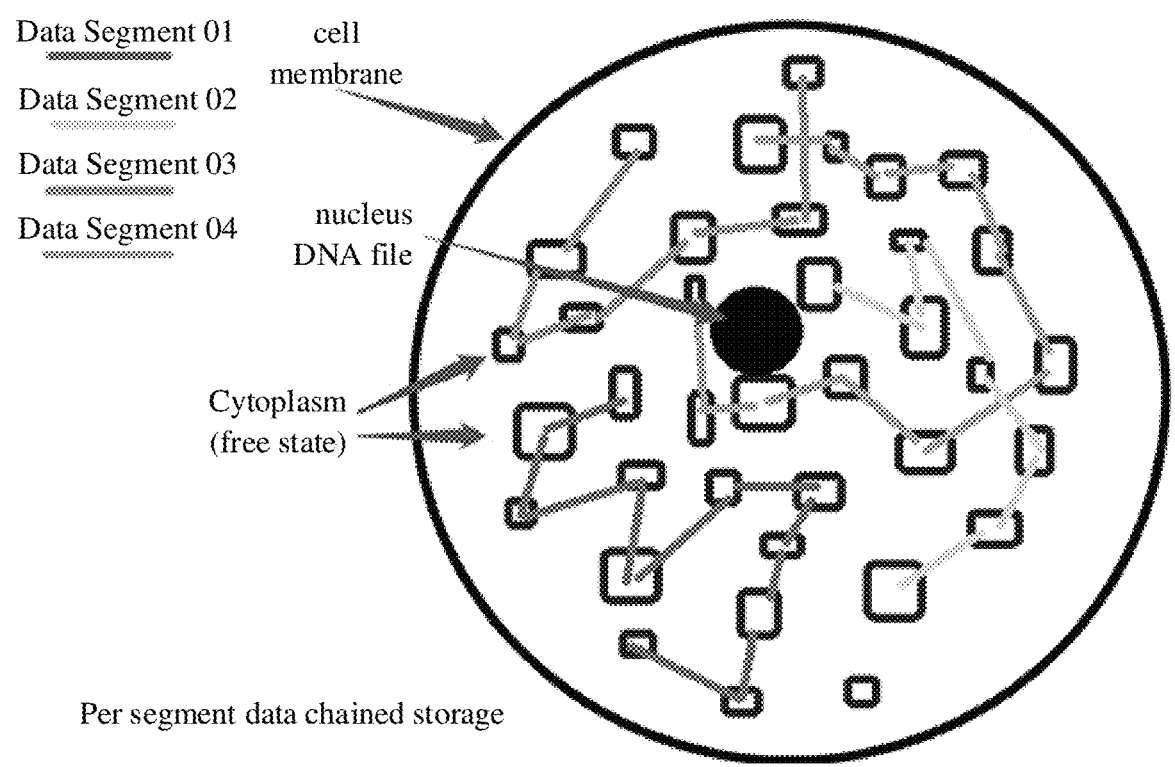
FIG. 5 is a schematic diagram of a three-dimensional data bionic structure provided by an embodiment of the present invention.

In some embodiments of the method for dynamically storing three-dimensional data, as shown in FIGS. 4 and 5, the method for dynamically storing three-dimensional data of the present embodiment comprises the following steps:

S111, dividing the original file into multiple data segment groups, and storing the plurality of data segment groups in three dimensions, and storing the three-dimensional file in an initial storage location in three-dimensional space.

Specifically, the original file herein refer to a file stored in a non-three-dimensional storage manner, that is, a file stored directly using a byte stream, such as commonly used document file, image file, audio file, video file, etc. In the prior art, the original file is directly stored on the storage medium, or encrypted and stored on the storage medium, which are all in the manner of direct storage using a byte stream. In order to improve security, in this embodiment, a three-dimensional spatial storage technique is used, wherein the original file is firstly divided into multiple data segment groups, and the three-dimensional file is obtained after three-dimensional storage of the multiple data segment groups. Alternatively, in dividing the original file into multiple data segment groups, the original file can be divided into multiple data segment groups of the same size, or the original file can be divided into multiple data segment groups of different sizes. The original file can be divided into multiple segment groups of different sizes and each segment group can be randomly assigned a size.

Further, the obtained three-dimensional file is stored in three-dimensional space. A location for initially storing a three-dimensional file in three-dimensional space in accordance with a three-dimensional storage rule is used as the initial storage location. Understandably, in this embodiment, the original file is divided into multiple data segment groups, so that it is stored in the three-dimensional space in groups of data segments. Since data is stored in three dimensions in a three-dimensional format, each data location is three-dimensional, which makes it more difficult to read and sort, and naturally more secure, compared to data stored directly using a byte stream. Understandably, although the three-dimensional file of the present embodiment is also stored on the storage medium in the form of a byte stream, it is distinguished from the prior art in which the byte stream is used for direct storage. The byte stream corresponding to the three-dimensional file in the present embodiment contains three-dimensional spatial information, which essentially indicates the stored three-dimensional space and the storage location in the three-dimensional space.

Referring to FIG. 4, a three-dimensional storage space is illustrated, with multiple cubes in the three-dimensional storage space being the data segment groups. It can be seen that each data segment group is three-dimensional storage, which has its own storage location, and the storage location is a three-dimensional storage location.

S121, changing the storage location of each of the data segment groups in the three-dimensional file in accordance with the preset movement rule.

Specifically, in order to further improve data security, in this embodiment, after storing the three-dimensional file, the bionic technology is used, which imitates the flow characteristic of the cytoplasm in the cell, so that the three-dimensional file "flows" in the three-dimensional storage space, that is, in accordance with the preset movement rule to change the three-dimensional file in the three-dimensional spatial storage location, so that the three-dimensional file is in the dynamic change. Understandably, in this embodiment, the original file is divided into multiple data segment groups, so that the data segment group is stored in the three-dimensional space. During the "flow" of the three-dimensional file, the data segment groups is moved as a unit. Alternatively, the location of at least one data segment group in the three-dimensional file can be moved, that is, one data segment group can be moved, or multiple data segment groups can be moved at the same time. Additionally, when changing the storage location of the three-dimensional file in three-dimensional space for data segment groups, it can be chosen to change it only once or to change it several times continuously. Understandably, by constantly changing the storage location of the three-dimensional file, it makes it difficult for a cracker to determine the definitive location of one of particular three-dimensional file, and not being able to determine the spatial location of the three-dimensional file, it is not possible to crack the file, thereby ensuring the security of the file.

Referring to FIG. 5, the initial file is divided into Data Segment 01, Data Segment 02, Data Segment 03, and Data Segment 04 in the figure and stored in three dimensions. Using bionic storage technology, a three-dimensional cellular structure type of three-dimensional storage space is demonstrated, which consists of a cell membrane, a cytoplasm (free state) and a nucleus (DNA file). The data segment groups are shown in the rectangular area of the figure, imitating the flow of cytoplasm, and the data segment groups in the figure can also be moved.

S131, restoring each of data segment groups in the three-dimensional file from the current storage location to the initial storage location according to the preset movement rule.

Specifically, when a user needs to use the three-dimensional file, the three-dimensional file is restored from the current storage location to the initial storage location according to the preset movement rule. In other words, the three-dimensional file is moved in reverse according to the preset movement rule so that the three-dimensional file is brought back to the initial storage location. The initial storage location is the initial storage location of the three-dimensional file in the three-dimensional space.

S141, restoring the three-dimensional file to the original file.

Specifically, after restoring the three-dimensional file from the current storage location to the initial storage location, a step opposite to converting the original file to the three-dimensional file is performed, that is, restoring the three-dimensional file to the original file.

The present embodiment divides the three-dimensional file into multiple data segment groups, and one or more data segment groups can be moved flexibly when moving the three-dimensional file, thereby further increasing the difficulty of cracking and improving the security of the data.

In some embodiments of the method for dynamically storing three-dimensional data, the method for dynamically storing three-dimensional data of the present embodiment comprises the following steps:

S112, dividing the original file into multiple data segment groups, and storing the plurality of data segment groups in three dimensions, and storing the three-dimensional file in an initial storage location in three-dimensional space.

Specifically, the original file herein refer to a file stored in a non-three-dimensional storage manner, that is, a file stored directly using a byte stream, such as commonly used document file, image file, audio file, video file, etc. In the prior art, the original file is directly stored on the storage medium, or encrypted and stored on the storage medium, which are all in the manner of direct storage using a byte stream. In order to improve security, in this embodiment, a three-dimensional spatial storage technique is used, wherein the original file is firstly divided into multiple data segment groups, and the three-dimensional file is obtained after three-dimensional storage of the multiple data segment groups. Alternatively, in dividing the original file into multiple data segment groups, the original file can be divided into multiple data segment groups of the same size, or the original file can be divided into multiple data segment groups of different sizes. The original file can be divided into multiple segment groups of different sizes and each segment group can be randomly assigned a size.

Further, the obtained three-dimensional file is stored in three-dimensional space. A location for initially storing a three-dimensional file in three-dimensional space in accordance with a three-dimensional storage rule is used as the initial storage location. Understandably, in this embodiment, the original file is divided into multiple data segment groups, so that it is stored in the three-dimensional space in groups of data segments. Since data is stored in three dimensions in a three-dimensional format, each data location is three-dimensional, which makes it more difficult to read and sort, and naturally more secure, compared to data stored directly using a byte stream. Understandably, although the three-dimensional file of the present embodiment is also stored on the storage medium in the form of a byte stream, it is distinguished from the prior art in which the byte stream is used for direct storage. The byte stream corresponding to the three-dimensional file in the present embodiment contains three-dimensional spatial information, which essentially indicates the stored three-dimensional space and the storage location in the three-dimensional space.

S122, changing the storage location of each of the data segment groups in the three-dimensional file in accordance with temporal information.

Specifically, in order to further improve data security, in this embodiment, after storing the three-dimensional file, the bionic technology is used, which imitates the flow characteristic of the cytoplasm in the cell, so that the three-dimensional file "flows" in the three-dimensional storage space, that is, That is, in accordance with the temporal information to change the three-dimensional file in the three-dimensional spatial storage location, so that the three-dimensional file is in the dynamic change. Alternatively, the temporal information includes, but is not limited to, a preset time point, a preset time interval, a time for opening a file, a time for saving a file, etc. For example, when the three-dimensional file receives an open request, the storage location of each data segment group in the three-dimensional file is first changed. For another example is to change the storage location of each data segment group in the three-dimensional file at a preset time point after the three-dimensional file is stored. And for another example, after the three-dimensional file is stored, the storage location of each data segment group in the three-dimensional file is changed every interval of a preset time interval.

Understandably, in this embodiment, the original file is divided into multiple data segment groups, so that the data segment group is stored in the three-dimensional space. During the "flow" of the three-dimensional file, the data segment groups is moved as a unit. Alternatively, the location of at least one data segment group in the three-dimensional file can be moved, that is, one data segment group can be moved, or multiple data segment groups can be moved at the same time. Additionally, when changing the storage location of the three-dimensional file in three-dimensional space for data segment groups, it can be chosen to change it only once or to change it several times continuously. Understandably, by constantly changing the storage location of the three-dimensional file, it makes it difficult for a cracker to determine the definitive location of one of particular three-dimensional file, and not being able to determine the spatial location of the three-dimensional file, it is not possible to crack the file, thereby ensuring the security of the file.

S132, restoring each of the data segment groups in the three-dimensional file from the current storage location to the initial storage location based on temporal information.

Specifically, when a user needs to use the three-dimensional file, the three-dimensional file is restored from the current storage location to the initial storage location according to the temporal information. It should be noted that since restoring from the current storage location to the initial storage location is an inverse process of moving the three-dimensional file from the initial storage location to the current storage location. Therefore, the temporal information used in the restoring process is consistent with the temporal information used in the movement of the three-dimensional file from the initial storage location to the current storage location, that is, the temporal information used in the movement of the three-dimensional file from the initial storage location to the current storage location is recorded for restoring the three-dimensional file from the current storage location to the initial storage location.

S142, restoring the three-dimensional file to the original file.

Specifically, after restoring the three-dimensional file from the current storage location to the initial storage location, a step opposite to converting the original file to the three-dimensional file is performed, that is, restoring the three-dimensional file to the original file.

The present embodiment divides the three-dimensional file into multiple data segment groups, and one or more data segment groups can be moved flexibly when moving the three-dimensional file. And it uses temporal information as a rule for the movement of three-dimensional file, thereby further increasing the difficulty of cracking and improving the security of the data.

In some embodiments of the method for dynamically storing three-dimensional data, based on the above embodiments, in this embodiment, converting the original file into the three-dimensional file comprises: encrypting the original file in accordance with a preset encryption algorithm to obtain an encrypted file, and converting the encrypted file into a three-dimensional file. Correspondingly, restoring the three-dimensional file to the original file comprises: restoring the three-dimensional file to the encrypted file, and the encrypted file being decrypted by a preset decryption algorithm and restored to the original file, the preset encryption algorithm corresponding to the preset decryption algorithm. In this embodiment, the original file is first encrypted before being converted a three-dimensional file, which can further improve the security of the data.

Figure 2:
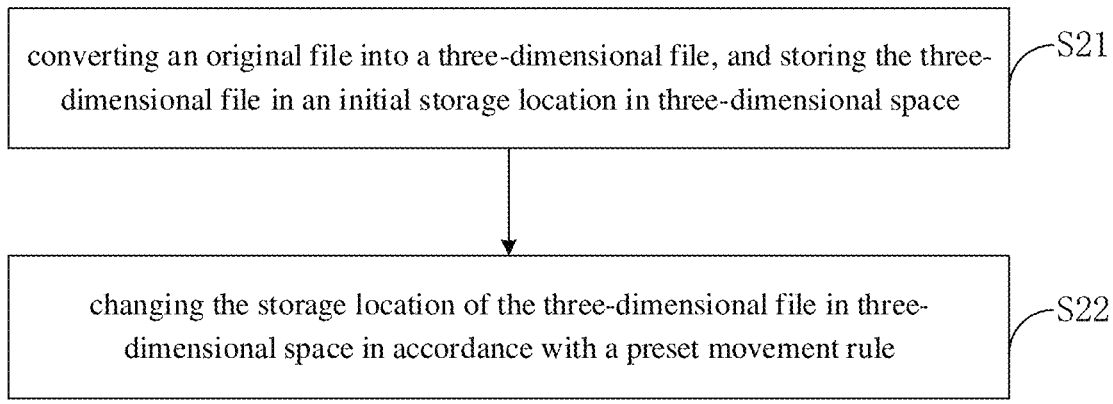
FIG. 2 is a flow chart of a method for dynamically storing three-dimensional data provided by an embodiment of the present invention.

Referring to FIG. 2, in a preferred embodiment, the method for dynamically storing three-dimensional data of the present embodiment is applied to encrypted storage of data, the method comprising the following steps:

S21, converting an original file into a three-dimensional file, and storing the three-dimensional file in an initial storage location in three-dimensional space.

Specifically, the original file herein refer to a file stored in a non-three-dimensional storage manner, that is, a file stored directly using a byte stream, such as commonly used document file, image file, audio file, video file, etc. In the prior art, the original file is directly stored on the storage medium, or encrypted and stored on the storage medium, which are all in the manner of direct storage using a byte stream. In order to improve security, in this embodiment, a three-dimensional spatial storage technique is used, wherein the original file is converted into a three-dimensional file and stored in the three-dimensional space. A location for initially storing a three-dimensional file in three-dimensional space in accordance with a three-dimensional storage rule is used as the initial storage location. Since data is stored in three dimensions in a three-dimensional format, each data location is three-dimensional, which makes it more difficult to read and sort, and naturally more secure, compared to data stored directly using a byte stream. Understandably, although the three-dimensional file of the present embodiment is also stored on the storage medium in the form of a byte stream, it is distinguished from the prior art in which the byte stream is used for direct storage. The byte stream corresponding to the three-dimensional file in the present embodiment contains three-dimensional spatial information, which essentially indicates the stored three-dimensional space and the storage location in the three-dimensional space.

S22, changing the storage location of the three-dimensional file in three-dimensional space in accordance with a preset movement rule.

Specifically, in order to further improve data security, in this embodiment after storing the three-dimensional file, the bionic technology is used, which imitates the flow characteristic of the cytoplasm in the cell, so that the three-dimensional file "flows" in the three-dimensional storage space, that is, in accordance with the preset movement rule to change the three-dimensional file in the three-dimensional spatial storage location, so that the three-dimensional file is in the dynamic change. Alternatively, when changing the storage location of the three-dimensional file in three-dimensional space, it can be chosen to change it only once or to change it several times continuously. Understandably, by constantly changing the storage location of the three-dimensional file, it makes it difficult for a cracker to determine the definitive location of one of particular three-dimensional file, and not being able to determine the spatial location of the three-dimensional file, it is not possible to crack the file, thereby ensuring the security of the file.

In this embodiment, the data is converted into a three-dimensional file for storage, and the spatial storage location of the three-dimensional file is changed during the storage process to make the stored data more secure.

In some embodiments of the method for dynamic storing of three-dimensional data, applied to encrypted storage of data, the method in which the original file is converted into a three-dimensional file comprises: dividing the original file into multiple data segment groups, and storing the plurality of data segment groups in three dimensions. Correspondingly, changing the storage location of the three-dimensional file in three-dimensional space in accordance with a preset movement rule comprises: changing the storage location of each of the data segment groups in the three-dimensional file in accordance with the preset movement rule.

In some embodiments of the method for dynamic storing of three-dimensional data, applied to encrypted storage of data, the method in which changing the storage location of each of the data segment groups in the three-dimensional file in accordance with the preset movement rule comprises: changing the storage location of each of the data segment groups in the three-dimensional file in accordance with temporal information. Alternatively, the temporal information includes, but is not limited to, a preset time point, a preset time interval, a time for opening a file, a time for saving a file, etc.

The three-dimensional data of this embodiment is stored in a process that enhances the difficulty of cracking by constantly changing the spatial storage location, thereby improving the security of the data.

Figure 3:
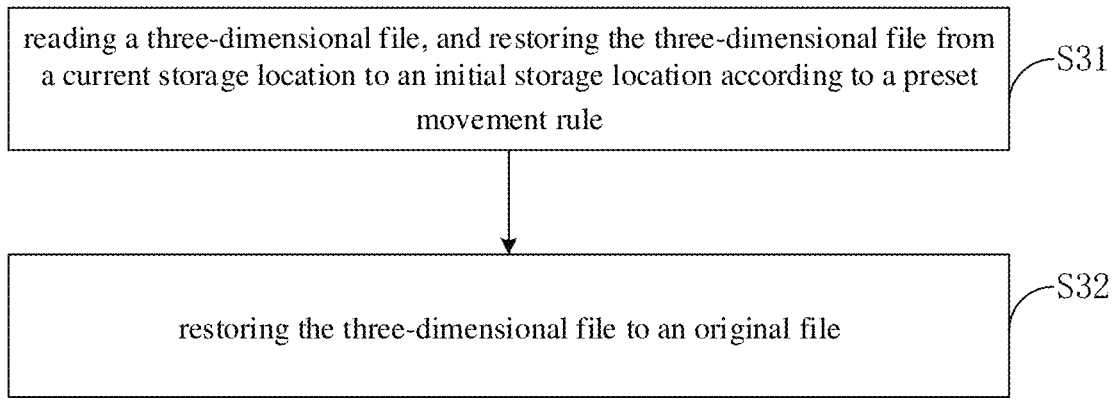
FIG. 3 is a flow chart of a method for dynamically storing three-dimensional data provided by an embodiment of the present invention.

Referring to FIG. 3, in a preferred embodiment, a method for dynamically storing three-dimensional data of this embodiment is applied to data reading, the method comprising the following steps:

S31, reading a three-dimensional file, and restoring the three-dimensional file from a current storage location to an initial storage location according to a preset movement rule.

Specifically, reading the three-dimensional file from the storage medium when a user needs to use the three-dimensional file, the three-dimensional file is restored from the current storage location to the initial storage location according to the preset movement rule. In other words, the three-dimensional file is moved in reverse according to the preset movement rule so that the three-dimensional file is brought back to the initial storage location. The initial storage location is the initial storage location of the three-dimensional file in the three-dimensional space.

S32, restoring the three-dimensional file to an original file.

Specifically, after restoring the three-dimensional file from the current storage location to the initial storage location, a step opposite to converting the original file to the three-dimensional file is performed, that is, restoring the three-dimensional file to the original file.

In this embodiment, when reading the three-dimensional file, it is necessary to recover the file using the same movement rule as moving the three-dimensional file in the storage process, which can make the data more secure.

In some embodiments of the method for dynamic storing of three-dimensional data, applied to data reading, the method in which restoring the three-dimensional file from a current storage location to an initial storage location according to a preset movement rule comprises: restoring each of data segment groups in the three-dimensional file from the current storage location to the initial storage location according to the preset movement rule, wherein the three-dimensional file comprises multiple data segment groups.

In some embodiments of the method for dynamic storing of three-dimensional data, applied to data reading, the method in which restoring each of data segment groups in the three-dimensional file from the current storage location to the initial storage location according to the preset movement rule comprises: restoring each of the data segment groups in the three-dimensional file from the current storage location to the initial storage location based on temporal information. The temporal information includes, but is not limited to, a preset time point, a preset time interval, a time for opening a file, a time for saving a file, etc.

In a preferred embodiment, the computer-readable storage medium of this embodiment, stored a computer program, the computer program being adapted to be loaded by the processor to perform the steps of the method for dynamically storing the three-dimensional data as in the above embodiment.

In a preferred embodiment, the computer of the present embodiment comprises a memory and a processor, the memory storing a computer program, and the processor performing the steps of the method of dynamically storing the three-dimensional data as described above by calling the computer program stored in the memory.

The embodiments are described in this specification in a progressive manner, with emphasis being placed on the differences between each embodiment and the other embodiments, and with reference to like parts of the embodiments. As for the device disclosed in the embodiment, since it corresponds to the method disclosed in the embodiment, the description is relatively simple, and the description of the related part can be referred to the method part.

Those skilled in the art will further appreciate that the example elements and algorithm steps described in connection with the embodiments disclosed herein can be implemented as electronic hardware, computer software, or a combination of both, and that the example elements and steps have been described generally functionally throughout the foregoing description in order to clearly illustrate the interchangeability of hardware and software. Whether these functions are performed in hardware or software depends on the particular application and design constraints of the technical solution. Killed artisans may implement the described functionality using different approaches for each particular application, but such implementations should not be construed as beyond the scope of the present invention.

The steps of a method or algorithm described in connection with the embodiments disclosed herein may be embodied directly in hardware, in a software module executed by a processor, or in a combination of the two. A software module may reside in random access memory (RAM), memory, read only memory (ROM), electrically programmable ROM, electrically erasable programmable ROM, registers, hard disk, a removable disk, a CD-ROM, or any other form of storage medium known in the art.

The above embodiments are only for illustrating the technical concepts and features of the present invention, and are intended to enable those skilled in the art to understand and implement the present invention, but not to limit the scope of protection of the present invention. All equivalent change and modifications that come within that scope of the append claims are intended to be embraced therein.

What is claimed is:

1. A method for dynamically storing three-dimensional data, characterized by comprising:
converting an original file into a three-dimensional file, storing the three-dimensional file in an initial storage location in three-dimensional space;
changing the storage location of the three-dimensional file in three-dimensional space in accordance with a preset movement rule;
restoring the three-dimensional file from a current storage location to the initial storage location according to the preset movement rule; and
restoring the three-dimensional file to the original file;
wherein the converting the original file into a three-dimensional file comprises: dividing the original file into multiple data segment groups, and storing the plurality of data segment groups in three dimensions;
changing the storage location of the three-dimensional file in three-dimensional space in accordance with a preset movement rule comprises: changing the storage location of each of the data segment groups in the three-dimensional file in accordance with the preset movement rule; and
restoring the three-dimensional file from a current storage location to the initial storage location according to the preset movement rule comprises: restoring each of the data segment groups in the three-dimensional file from the current storage location to the initial storage location according to the preset movement rule.

2. The method for dynamically storing three-dimensional data according to claim 1, characterized in that dividing the original file into multiple data segment groups comprises:
dividing the original file into multiple data segment groups of the same size; or
dividing the original file into multiple data segment groups of different sizes.

3. The method for dynamically storing three-dimensional data according to claim 1, characterized in that changing the storage location of each of the data segment groups in the three-dimensional file in accordance with the preset movement rule comprises: changing the storage location of each of the data segment groups in the three-dimensional file in accordance with temporal information; and
restoring each of the data segment groups in the three-dimensional file from the current storage location to the initial storage location according to the preset movement rule comprises: restoring each of the data segment groups in the three-dimensional file from the current storage location to the initial storage location based on the temporal information.

4. The method for dynamically storing three-dimensional data according to claim 3, characterized in that the temporal information comprises at least one of a preset time point, a preset time interval, a time for opening a file, and a time for saving a file.

5. The method for dynamically storing three-dimensional data according to claim 1, characterized in that converting the original file into the three-dimensional file comprises:
encrypting the original file in accordance with a preset encryption algorithm to obtain an encrypted file, and converting the encrypted file into a three-dimensional file; and
restoring the three-dimensional file to the original file comprises: restoring the three-dimensional file to the encrypted file, and the encrypted file being decrypted by a preset decryption algorithm and restored to the original file.

6. A computer-readable storage medium, characterized in that the computer-readable storage medium storing a computer program, the computer program being adapted to be loaded by a processor to perform the steps of the method for dynamically storing the three-dimensional data according to claim 1.

7. A computer, characterized by comprising a memory and a processor, the memory storing a computer program, and the processor performing the steps of the method of dynamically storing the three-dimensional data according to claim 1 by calling the computer program stored in the memory.

* * * * *